(12) United States Patent
Steyer et al.

(10) Patent No.: US 7,942,229 B2
(45) Date of Patent: May 17, 2011

(54) DUAL-TUNED VIBRATION DAMPER AND METHOD FOR DAMPING VIBRATIONS IN A POWER TRANSMISSION SYSTEM USING A DUAL-TUNED VIBRATION DAMPER

(75) Inventors: Glen Steyer, Rochester Hills, MI (US); Zhaohui Sun, Rochester Hills, MI (US); David P Schankin, Harper Woods, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 373 days.

(21) Appl. No.: 12/259,461

(22) Filed: Oct. 28, 2008

(65) Prior Publication Data

US 2010/0106335 A1   Apr. 29, 2010

(51) Int. Cl.
*B60K 17/24* (2006.01)
*F16F 15/31* (2006.01)

(52) U.S. Cl. ...... 180/381; 464/180; 701/111; 123/192.2
(58) Field of Classification Search ............... 123/192.2; 701/111; 464/147, 180–182; 180/381
See application file for complete search history.

(56) References Cited

U.S. PATENT DOCUMENTS

| | | | |
|---|---|---|---|
| 3,314,304 A | 4/1967 | Katzenberger et al. | |
| 3,670,593 A | 6/1972 | Troyer | |
| 3,800,555 A * | 4/1974 | Arneson | 464/138 |
| 3,848,694 A * | 11/1974 | Matsui et al. | 180/381 |
| 3,945,269 A | 3/1976 | Bremer, Jr. | |
| 4,041,803 A | 8/1977 | Goloff et al. | |
| 4,881,426 A | 11/1989 | Serizawa et al. | |
| 5,415,061 A * | 5/1995 | Kohno | 74/573.11 |
| 5,449,322 A | 9/1995 | Wagner | |
| 5,503,043 A | 4/1996 | Olbrich | |
| 5,666,862 A * | 9/1997 | Eckel et al. | 74/574.3 |
| 5,671,909 A * | 9/1997 | Hamada et al. | 267/141 |
| 5,704,839 A | 1/1998 | Michael et al. | |
| 5,971,859 A * | 10/1999 | Runge et al. | 464/180 |
| 6,089,204 A | 7/2000 | Shaffer | |
| 6,312,340 B1 * | 11/2001 | Gassen et al. | 464/180 |
| 6,623,364 B2 * | 9/2003 | Badolato et al. | 464/127 |
| 6,682,060 B2 * | 1/2004 | Kato et al. | 267/141 |
| 6,907,774 B2 * | 6/2005 | Kurecka et al. | 73/115.06 |
| 6,981,302 B1 * | 1/2006 | Breese et al. | 29/407.07 |
| 7,004,291 B2 * | 2/2006 | Schankin et al. | 188/266.1 |
| 7,022,023 B2 | 4/2006 | Guo et al. | |

* cited by examiner

*Primary Examiner* — Erick Solis
(74) *Attorney, Agent, or Firm* — Harness, Dickey & Pierce, P.L.C.

(57) ABSTRACT

A vibration damper includes a hub, a first mass, a first resilient coupling, a second mass, and a second resilient coupling. The first mass is disposed concentrically about the hub. The first resilient coupling resiliently couples the first mass to the hub. The first resilient coupling has a first spring constant. The second mass is disposed concentrically about the first mass. The second resilient coupling resiliently couples the second mass directly to the first mass. The second resilient coupling has a second spring constant that is less than the first spring constant. The first mass and the first resilient coupling are configured to attenuate vibration at a first frequency. The second mass and the second resilient coupling are configured to attenuate vibration at a second frequency. The second frequency is lower than the first frequency.

20 Claims, 3 Drawing Sheets

DUAL-TUNED VIBRATION DAMPER AND METHOD FOR DAMPING VIBRATIONS IN A POWER TRANSMISSION SYSTEM USING A DUAL-TUNED VIBRATION DAMPER

FIELD

The present disclosure relates to a dual-tuned vibration damper and a method for damping vibrations in a power transmission system using a dual-tuned vibration damper.

BACKGROUND

This section provides background information related to the present disclosure which is not necessarily prior art.

Vibration dampers are commonly used with rotating shafts or other rotary components in a power transmission system, such as a crankshaft of an internal combustion engine. The purpose of such vibration dampers is to damp the torsional vibrations at a specific frequency that is associated with the vibrations caused by the cyclic forces applied to the rotary components during rotation.

In automotive vehicles that transmit rotary power from a powertrain to a rear axle via a propshaft, it is possible for the propshaft to transmit vibration at a first frequency to the rear axle (from the powertrain) and to transmit vibration at a second, different frequency to the powertrain (from the rear axle). It was relatively commonplace to alter the operational characteristics of the powertrain (e.g., the torque converter or the transmission) to attenuate vibrations transmitted from the powertrain to the propshaft, as well as to employ a vibration damper to dampen vibrations transmitted from the rear axle to the propshaft. As such alterations to the operational characteristics of the powertrain can adversely affect the mileage of a vehicle, there is increasing resistance on the part of original equipment manufacturers to make such alterations. Consequently, it is increasingly necessary for designers of vehicle drivelines to deal with multiple sources of vibration in the vehicle driveline.

One approach that we have considered includes the use of a first vibration damper that is coupled to a first side of the vehicle propshaft for attenuating vibration at the first frequency, and a second vibration damper that is coupled to a second side of the vehicle propshaft for attenuating vibration at the second frequency. While such solution can be effective in some situations, we noted that there is considerable cost associated with the provision and installation of two discrete vibration dampers. Moreover, it would not be possible in some situations to integrate two discrete dampers into the vehicle driveline.

SUMMARY

This section provides a general summary of the disclosure, and is not a comprehensive disclosure of its full scope or all of its features.

In one form, the present disclosure provides a method for damping vibrations in a power transmission system. The power transmission system includes a first power transmitting component, a second power transmitting component and a shaft that is adapted to transmit rotary power between the first and second power transmitting components. The method includes: identifying a first frequency associated with vibration transmitted from the first power transmitting component to the shaft; identifying a second frequency associated with vibration transmitted from the second power transmitting component to the shaft, the second frequency being different from the first frequency; and coupling a damper to the shaft, the damper including a hub, a first mass, a second mass, a first resilient coupling, and a second resilient coupling, the first mass being disposed concentrically about the hub, the second mass being disposed concentrically about the hub and the first mass, the first resilient coupling resiliently coupling the first mass to the hub, the second resilient coupling resiliently coupling the second mass directly to the first mass. The first mass and the first resilient coupling are configured to attenuate vibration at a higher one of the first and second frequencies. The second mass and the second resilient coupling are configured to attenuate vibration at a lower one of the first and second frequencies.

In another form, the present disclosure provides a method for damping vibrations in a power transmission system. The power transmission system includes a first power transmitting component, a second power transmitting component and a shaft that is adapted to transmit rotary power between the first and second power transmitting components. The method includes: identifying a first frequency associated with vibration transmitted through the shaft; identifying a second frequency associated with vibration transmitted though the shaft, the second frequency being lower than the first frequency; and coupling a damper to the shaft, the damper including a hub, a first mass, a second mass, a first resilient coupling and a second resilient coupling, the first mass being disposed concentrically about the hub, the second mass being disposed concentrically about the hub and the first mass, the first resilient coupling resiliently coupling the first mass to the hub, the second resilient coupling resiliently coupling the second mass directly to the first mass. The first mass and the first resilient coupling are configured to attenuate vibration at the first frequency. The second mass and the second resilient coupling are configured to attenuate vibration at the second frequency.

In yet another form, the present disclosure provides a vibration damper comprising a hub, a first mass, a first resilient coupling, a second mass, and a second resilient coupling. The first mass is disposed concentrically about the hub. The first resilient coupling resiliently couples the first mass to the hub. The first resilient coupling has a first spring constant. The second mass is disposed concentrically about the first mass. The second resilient coupling resiliently couples the second mass directly to the first mass. The second resilient coupling has a second spring constant that is less than the first spring constant. The first mass and the first resilient coupling are configured to attenuate vibration at a first frequency. The second mass and the second resilient coupling are configured to attenuate vibration at a second frequency. The second frequency is lower than the first frequency.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
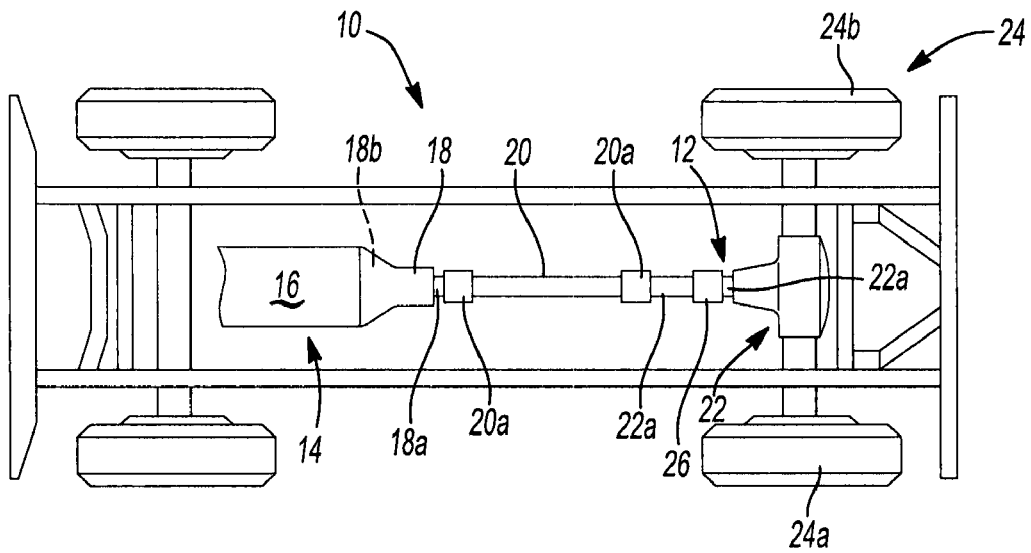
FIG. 1 is a schematic illustration of an automotive vehicle having a vibration damper constructed in accordance with the teachings of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 6:
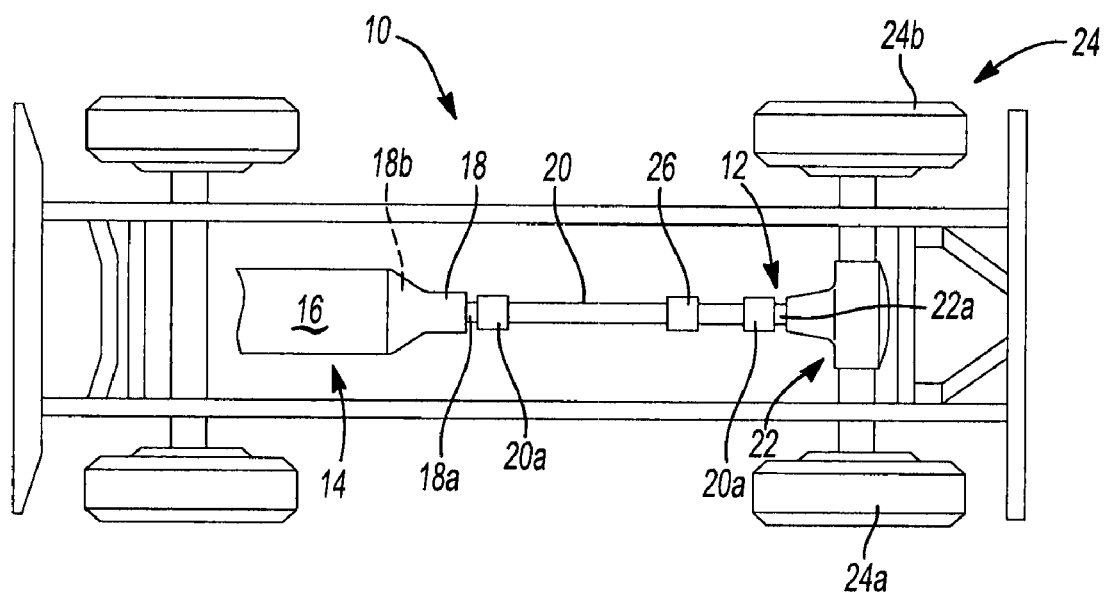
FIG. 6 is a schematic illustration similar to that of FIG. 1 but illustrating the vibration damper as mounted in a different location.

With reference to FIG. 1 of the drawings, an automotive vehicle 10 is schematically illustrated as including a driveline 12 that is drivable via a connection to a powertrain 14. The powertrain 14 can include an engine 16 and a transmission 18. The driveline 12 can include a propshaft 20, a rear axle assembly 22 and a plurality of wheels 24. The engine 16 can be mounted in an in-line or longitudinal orientation along the axis of the vehicle 10 and its output can be selectively coupled to the input of the transmission 18 to transmit rotary power (i.e., drive torque) therebetween. The input (not specifically shown) of the transmission 18 can be commonly aligned with the output of the engine 16 for rotation about a rotary axis. The transmission 18 can also include an output 18a and a gear reduction unit 18b. The gear reduction unit 18b can be operable for coupling the transmission input to the transmission output 18a at a predetermined gear speed ratio. Couplings 20a, such as universal joints, flexible couplings and/or universal joints, can be incorporated into the opposite ends of the propshaft 20. A first end of the propshaft 20 can be coupled for rotation with the output 18a of the transmission 18, and a second, opposite end of the propshaft 20 can be coupled for rotation with an input pinion 22a of the rear axle assembly 22. Drive torque can be transmitted through the propshaft 20 to the rear axle assembly 22 where it can be selectively apportioned in a predetermined manner to the left and right rear wheels 24a and 24b, respectively. A vibration damper 26 constructed in accordance with the teachings of the present disclosure can be coupled to the driveline 12. While the vibration damper 26 is illustrated as being coupled to the input pinion 22a, it will be appreciated that the location of the vibration damper 26 can be altered as desired. In this regard, the vibration damper 26 can be mounted to the output 18a of the transmission 18, to the propshaft 20 proximate the transmission 18, or to the propshaft 20 proximate the rear axle assembly 22 as shown in FIG. 6.

Figure 2:
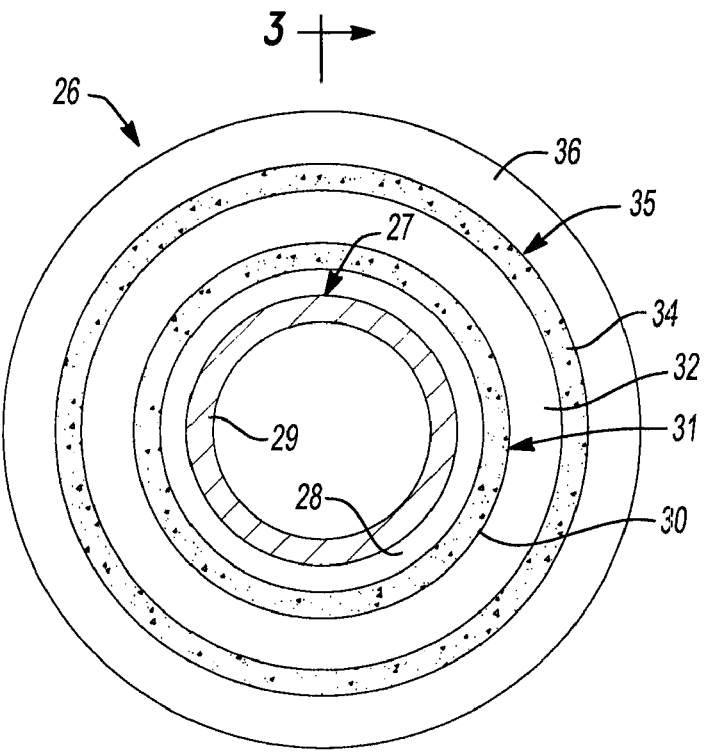
FIG. 2 is a front elevational view of the vibration damper of FIG. 1.
Figure 3:
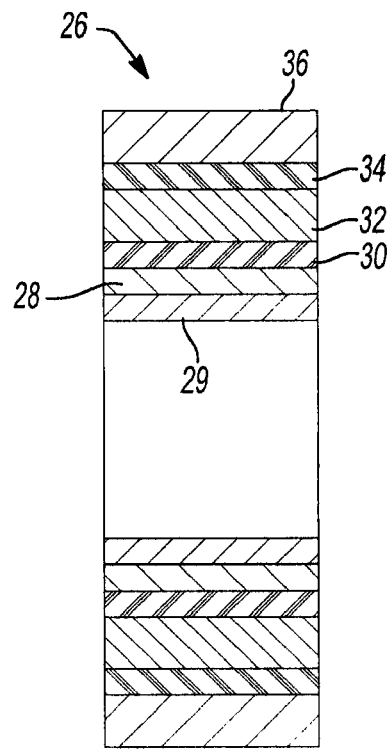
FIG. 3 is a sectional view taken along the line 3-3 of FIG. 2.

With reference to FIGS. 2 and 3, the vibration damper 26 can include a hub 28, a first resilient coupling 30, a first mass 32, a second resilient coupling 34, and a second mass 36. The hub 28 can include a central aperture 27 that can be sized to receive an element of the driveline 12 (FIG. 1), such as a tubular shaft member 29 of the propshaft 20. The first mass 32 can define an aperture 31 into which the hub 28 can be received. The first resilient coupling 30 can resiliently couple the first mass 32 to the hub 28. The first resilient coupling 30 can directly contact the hub 28 and the first mass 32 and can have a first spring constant k1. In the particular example shown, the first resilient coupling 30 directly contacts the hub 28 about its full outer circumference and directly contacts the first mass 32 about the full inner circumference of the aperture 31. It will be appreciated, however, that amount of contact between the first resilient coupling 30 and the hub 28 and/or the first mass 32 can be tailored to a desired degree and as such, the outer circumference of the hub 28, the inner circumference of the aperture 31 and/or the first resilient coupling 30 can be constructed in a discontinuous manner. The second mass 36 can define an aperture 35 into which the first mass 32 can be received. The second resilient coupling 34 can resiliently couple the second mass 36 directly to the first mass 32. In the example provided, the second resilient coupling 34 directly contacts the first mass 32 along its full outer circumference and directly contacts the second mass 36 along the full inner circumference of the aperture 35. It will be appreciated, however, that amount of contact between the second resilient coupling 34 and the first mass 32 and/or the second mass 36 can be tailored to a desired degree and as such, the outer circumference of the first mass 32, the inner circumference of the aperture 35 and/or the second resilient coupling 34 can be constructed in a discontinuous manner. The second resilient coupling 34 can have a second spring constant k2 that is different from the first spring constant k1. For example, the second spring constant k2 can be less than the first spring constant k1. The first and second resilient couplings 30 and 34 can be formed of a desired resilient material, such as an elastomer or thermoplastic elastomer.

The first mass 32 and the first resilient coupling 30 can be configured to attenuate vibration at a first frequency f1. The second mass 36 and the second resilient coupling 34 can be configured to attenuate vibration at a second frequency f2. The second frequency f2 can be lower than the first frequency f1. The first frequency f1 can be greater than or equal to 250 Hertz and less than or equal to 600 Hertz. For example, the first frequency f1 can be greater than or equal to 300 Hertz and less than or equal to 500 Hertz. The second frequency f2 can be greater than or equal to 20 Hertz and less than or equal to 200 Hertz. For example, the second frequency f2 can be greater than or equal to 50 Hertz and less than or equal to 150 Hertz.

With reference to FIGS. 1 and 2, a method for damping vibrations in accordance with the teachings of the present disclosure is provided. The method can include identifying a first frequency f1 associated with vibration transmitted from a first power transmitting component, such as the automotive transmission 18, to the propshaft 20; identifying a second frequency f2 associated with vibration transmitted from a second power transmitting component, such as the rear axle assembly 22, to the propshaft 20, the second frequency f2 being different from the first frequency f1; and coupling a vibration damper 26 to the propshaft 20. The vibration damper 26 can include a hub 28, a first mass 32, a second mass 36, a first resilient coupling 30, and a second resilient coupling 34. The first mass 32 can be disposed concentrically about the hub 28. The second mass 36 can be disposed concentrically about the hub 28 and the first mass 32. The first resilient coupling 30 can resiliently couple the first mass 32 to the hub 28. The second resilient coupling 34 can resiliently couple the second mass 36 directly to the first mass 32. The first mass 32 and the first resilient coupling 30 can be configured to attenuate vibration at a higher one of the first and second frequencies f1 and f2. The second mass 36 and the second resilient coupling 34 can be configured to attenuate vibration at a lower one of the first and second frequencies f1 and f2.

Another method for damping vibrations in accordance with the teachings of the present disclosure is provided. The method can include identifying a first frequency f1 associated with vibration transmitted through the propshaft 20; identifying a second frequency f2 associated with vibration transmitted though the propshaft 20, the second frequency f2 being lower than the first frequency f1; and coupling a vibration damper 26 to the propshaft 20. The vibration damper 26 can include a hub 28, a first mass 32, a second mass 36, a first resilient coupling 30, and a second resilient coupling 34. The first mass 32 can be disposed concentrically about the hub 28. The second mass 36 can be disposed concentrically about the hub 28 and the first mass 32. The first resilient coupling 30 can resiliently couple the first mass 32 to the hub 28. The second resilient coupling 34 can resiliently couple the second mass 36 directly to the first mass 32. The first mass 32 and the first resilient coupling 30 can be configured to attenuate vibration at the first frequency f1. The second mass 36 and the second resilient coupling 34 are configured to attenuate vibration at the second frequency f2.

Figure 4:
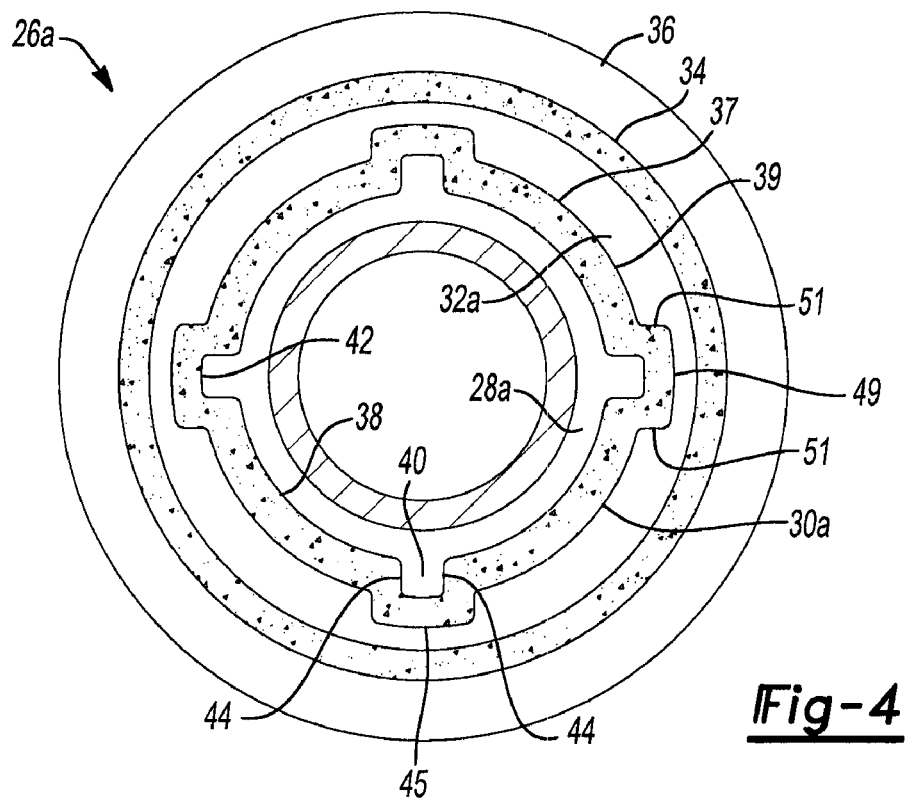
FIGS. 4 and 5 are front elevational views of other vibration dampers constructed in accordance with the teachings of the present disclosure.

With reference to FIG. 4, another vibration damper 26a constructed in accordance with the teachings of the present disclosure is shown. Except as described herein, the hub 28a, the first resilient coupling 30a, and the first mass 32a can be similar to the hub 28, the first resilient coupling 30, and the first mass 32 described above and illustrated in FIGS. 2 and 3, respectively. The hub 28a, the first resilient coupling 30a, and the first mass 32a can cooperate to form a toothed interface 37.

In the particular example, the hub 28a can have an outer hub surface 38. The first mass 32a can have an inner first mass surface 39. A plurality of projections 40 can extend outward from the outer hub surface 38 and can be received by corresponding recesses 45 formed on the inner first mass surface 39, respectively. In the particular example provided, four projections 40 and four corresponding recesses 45 are employed, but those of skill in the art can appreciate that more or fewer projections 40 and recesses 45 could be employed. Each of the projections 40 has a circumferentially extending portion 42 and at least two radially extending portions 44. Each of the recesses 45 has a corresponding circumferentially extending portion 49 and at least two corresponding radially extending portions 51. The first resilient coupling 30a can extend around and directly contact both the outer hub surface 38 and the inner first mass surface 39. In the particular example, the first resilient coupling 30a is compressed between the two circumferentially extending portions 42 and 49 and between the two radially extending portions 44 and 51.

Figure 5:
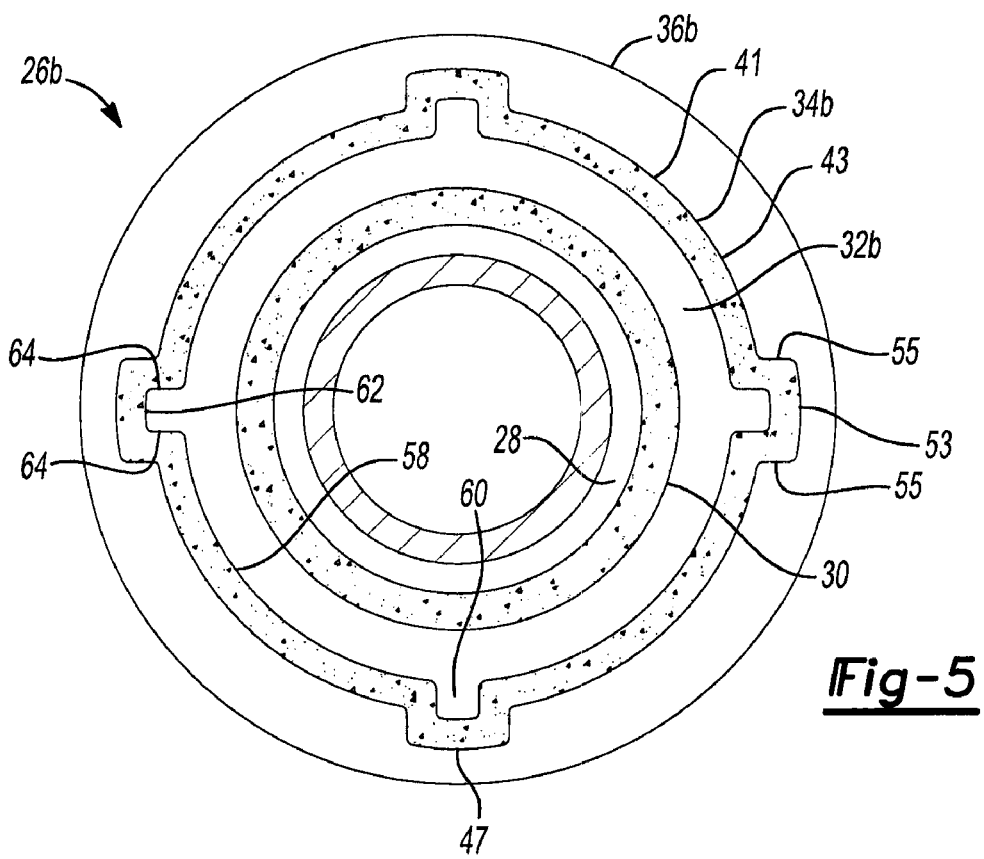

With reference to FIG. 5, yet another vibration damper 26b constructed in accordance with the teachings of the present disclosure is shown. Except as described herein, the first mass 32b, the second resilient coupling 34b, and the second mass 36b can be similar to the first mass 32, the second resilient coupling 34, and the second mass 36 described above and illustrated in FIGS. 2 and 3, respectively. The first mass 32b, the second resilient coupling 34b, and the second mass 36b can cooperate to form a toothed interface 41.

In the particular example, the first mass 32b can have an outer first mass surface 58. The second mass 36b can have an inner second mass surface 43. A plurality of projections 60 can extend outward from the outer first mass surface 58 and can be received by corresponding recesses 47 formed on the inner second mass surface 43, respectively. In the particular example provided, four projections 60 and four corresponding recesses 47 are employed, but those of skill in the art can appreciate that more or fewer projections 60 and recesses 47 could be employed. Each of the projections 60 can have a circumferentially extending portion 62 and at least two radially extending portions 64. Each of the recesses 47 has a corresponding circumferentially extending portion 53 and at least two corresponding radially extending portions 55. The second resilient coupling 34b can extend around and directly contact both the outer first mass surface 58 and the inner second mass surface 43. In the particular example, the second resilient coupling 34b is compressed between the two circumferentially extending portions 62 and 53 and between the two radially extending portions 64 and 55.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method for damping vibrations in a power transmission system, the power transmission system including a first power transmitting component, a second power transmitting component and a shaft that is adapted to transmit rotary power between the first and second power transmitting components, the method comprising:
   identifying a first frequency associated with vibration transmitted from the first power transmitting component to the shaft;
   identifying a second frequency associated with vibration transmitted from the second power transmitting component to the shaft, the second frequency being different from the first frequency; and
   coupling a damper to the shaft, the damper including a hub, a first mass, a second mass, a first resilient coupling, and a second resilient coupling, the first mass being disposed concentrically about the hub, the second mass being disposed concentrically about the hub and the first mass, the first resilient coupling resiliently coupling the first mass to the hub, the second resilient coupling resiliently coupling the second mass directly to the first mass;
   wherein the first mass and the first resilient coupling are configured to attenuate vibration at a higher one of the first and second frequencies and wherein the second mass and the second resilient coupling are configured to attenuate vibration at a lower one of the first and second frequencies.

2. The method of claim 1, wherein the first resilient coupling has a first spring constant and wherein the second resilient coupling has a second spring constant that is less than the first spring constant.

3. The method of claim 1, wherein the second resilient coupling directly contacts both the first and second masses.

4. The method of claim 1, wherein the first and second resilient couplings are formed of a thermoplastic elastomer.

5. The method of claim 1, wherein the first power transmitting component is a transmission and wherein the second power transmitting component is an axle assembly.

6. The method of claim 1, wherein the hub, the first resilient coupling, and the first mass cooperate to form a first interface; wherein the first mass, the second resilient coupling, and the second mass cooperate to form a second interface; and wherein at least one of the first and second interfaces is a toothed interface.

7. A method for damping vibrations in a power transmission system, the power transmission system including a first power transmitting component, a second power transmitting component and a shaft that is adapted to transmit rotary power between the first and second power transmitting components, the method comprising:
   identifying a first frequency associated with vibration transmitted through the shaft;
   identifying a second frequency associated with vibration transmitted though the shaft, the second frequency being lower than the first frequency;
   coupling a damper to the shaft, the damper including a hub, a first mass, a second mass, a first resilient coupling and a second resilient coupling, the first mass being disposed concentrically about the hub, the second mass being disposed concentrically about the hub and the first mass, the first resilient coupling resiliently coupling the first mass to the hub, the second resilient coupling resiliently coupling the second mass directly to the first mass;
   wherein the first mass and the first resilient coupling are configured to attenuate vibration at the first frequency and wherein the second mass and the second resilient coupling are configured to attenuate vibration at the second frequency.

8. The method of claim 7, wherein the first resilient coupling has a first spring constant and wherein the second resilient coupling has a second spring constant that is less than the first spring constant.

9. The method of claim 7, wherein the second resilient coupling directly contacts both the first and second masses.

10. The method of claim 7, wherein the first and second resilient couplings are formed of a thermoplastic elastomer.

11. The method of claim 7, wherein the first frequency is greater than or equal to 250 Hertz and less than or equal to 600 Hertz.

12. The method of claim 7, wherein the first frequency is greater than or equal to 300 Hertz and less than or equal to 500 Hertz.

13. The method of claim 7, wherein the second frequency is greater than or equal to 20 Hertz and less than or equal to 200 Hertz.

14. The method of claim 7, wherein the second frequency is greater than or equal to 50 Hertz and less than or equal to 150 Hertz.

15. The method of claim 7, wherein the first power transmitting component is a transmission and wherein the second power transmitting component is an axle assembly.

16. The method of claim 7, wherein the hub, the first resilient coupling, and the first mass cooperate to form a first interface; wherein the first mass, the second resilient coupling, and the second mass cooperate to form a second interface; and wherein at least one of the first and second interfaces is a toothed interface.

17. A vibration damper comprising:
   a hub;
   a first mass disposed concentrically about the hub;
   a first resilient coupling resiliently coupling the first mass to the hub, the first resilient coupling having a first spring constant;
   a second mass disposed concentrically about the first mass; and
   a second resilient coupling resiliently coupling the second mass directly to the first mass, the second resilient coupling having a second spring constant that is less than the first spring constant;
   wherein the first mass and the first resilient coupling are configured to attenuate vibration at a first frequency and wherein the second mass and the second resilient coupling are configured to attenuate vibration at a second frequency, the second frequency being lower than the first frequency.

18. The vibration damper of claim 17, wherein the second resilient coupling directly contacts both the first and second masses.

19. The vibration damper of claim 17, wherein the first and second resilient couplings are formed of a thermoplastic elastomer.

20. The vibration damper of claim 17, wherein the first frequency is greater than or equal to 250 Hertz and less than or equal to 600 Hertz.

* * * * *